Patented Aug. 24, 1943

2,327,426

UNITED STATES PATENT OFFICE 2,327,426

DYEING CELLULOSE DERIVATIVES

Kenneth Ronald House and Henry Charles Olpin, Spondon, near Derby, England, assignors to Celanese Corporation of America, a corporation of Delaware No Drawing. Application May 14, 1940, Serial No. 335,146. In Great Britain June 7, 1939

5 Claims. (Cl. 8—48)

This invention relates to the production of new azo dyes and to the production of cellulose ester and ether textile and other products coloured therewith.

According to the present invention cellulose acetate or other cellulose ester or ether materials are coloured by forming an azo dye on the materials by coupling a diazotised aryl-azo aniline having a nitro group in the aryl nucleus, with a primary aromatic mono-amine of the benzene series which is free from nuclear hydroxyl groups and which couples in para position to the primary amino group, for example, p-xylidine and cresidine, (3-amino-4-methoxy-1-methyl benzene). Particularly useful products are those obtained from 4-amino-4'-nitro-azo-benzenes, including those in which halogen is present in either one or both benzene nuclei in ortho position to the azo group. Especially useful for the purposes of the invention are the nitro-amino-azo-benzenes of the general formula

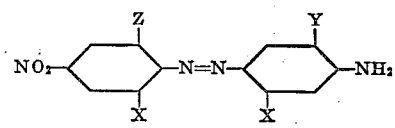

wherein at least one X represents halogen, Y represents hydrogen, halogen, alkyl or alkoxy and Z represents hydrogen or halogen.

In this way it is possible to obtain a series of orange to brown shades which are of very good fastness properties, including fastness to light and washing, and which are readily dischargeable, for example by zinc formaldehyde sulphoxylate.

The nitro-aryl-azo anilines utilised according to the invention can be made by coupling appropriate diazotised nitro-aromatic amines with appropriate coupling components. Nitro-amines which can be employed for this purpose are p-nitro-aniline, o-nitro-aniline, 5-nitro-2-amino-toluene, 5-nitro-2-amino-anisol, 4-chlor-2-nitro-aniline, 2-chlor-4-nitro-aniline and 2.6-dichlor-4-nitro-aniline. As coupling components for the production of the nitro-aryl-azo-anilines can be used primary amines of the benzene series which couple with diazo compounds in para position to the primary amino group. Very useful products can be obtained by using aniline substituted in either the 3-position or in both the 3- and 6-positions the remaining positions being unoccupied by substituents. Examples of coupling components of this character are m-toluidine, m-chloraniline, p-xylidine, cresidine and 2:5-di-methoxy-aniline. Specific examples of the nitro-aryl-azo anilines which are used according to the invention are 4-nitro-2-chlorbenzene-azo-m-chloraniline, 4-nitro-2-chlorbenzene-azo-cresidine and 4-nitro-2-chlorbenzene-azo-aniline.

Various primary mono-amines of the benzene series can be employed as coupling components for coupling with the diazotised nitro-aryl-azo anilines. Particularly useful are anilines having the para position to the primary amino group free and containing substituents in the 3-position or in both 3- and 6-positions in relation to the primary amino group. Such compounds are m-chlor-aniline, m-toluidine, mono-acetyl-m-phenylene diamine, 3-acetylamino-6-methyl-aniline, and 3-acetylamino-6-methoxy-aniline, in addition to the p-xylidine and cresidine mentioned above. The following table shows the shades obtainable on cellulose acetate from certain diazotised nitro-aryl-azo-anilines and primary mono-amines of the benzene series which couple in para position to the primary amino group.

| Nitro-aryl-azo aniline | Coupling component | Shade |
|---|---|---|
| 4-nitro-2-chlor benzene-azo-m-chloraniline. | p-xylidine | Golden brown. |
| Do | cresidine | Brown. |
| Do | m-toluidine | Golden brown. |
| Do | m-chloraniline | Golden orange. |
| 4-nitro-benzene-azo-m-toluidine. | p-xylidine | Deep orange. |

The shades mentioned in the table are readily dischargeable with zinc formaldehyde sulphoxylate and are of good fastness to light and washing.

As regards the procedure to be followed in forming the dyes on cellulose ester or ether materials, it is preferred to incorporate the nitro-aryl-azo-anilines in the material and then to effect diazotisation and couple with the coupling component in a separate bath.

The nitro-aryl-azo anilines can be applied to cellulose ester or ether materials in the form of aqueous dispersions. Bath methods may be employed, that is to say methods in which the materials are allowed to absorb the nitro-aryl-azo-aniline component from an aqueous dispersion of the latter in which they are immersed. Again, mechanical impregnation methods may be used, the materials being impregnated with a quantity of liquid containing the whole of the requisite proportion of the nitro-aryl-azo-aniline. To this end padding or printing methods may be utilised. The mechanically impregnated material may then be aged or steamed to cause the nitro-aryl-azo-aniline to enter the cellulose ester or ether material.

The nitro-aryl-azo-anilines used according to the present invention have substantive affinity for cellulose esters or ethers but in general substantially no affinity for cellulose. If, therefore, such a nitro-aryl-azo-aniline is applied to mixed materials containing both cellulose, e. g. cotton or regenerated cellulose, and a cellulose ester or ether, the latter alone takes up the nitro-aryl-azo-aniline, so that on diazotising and coupling with the coupling component the cellulose component of the material remains uncoloured. By suitably colouring the cellulose component of such mixed material with dyestuffs resisting the cellulose ester or ether component of the materials, solid shades or two colour effects can readily be obtained according to the components and dyes selected. The dyestuff for the cellulose portion can be applied before or after the development of the azo dye on the cellulose ester or ether portion. If applied before development of the azo dye it may be applied either together with or separately from the nitro-aryl-azo-aniline applied to the cellulose ester or ether portion.

The dyeings produced on cellulose ester or ether materials with the aid of the diazotised nitro-aryl-azo-anilines and primary amine coupling components in accordance with the invention may be topped with other dyes, particularly with dyes having direct affinity for the cellulose ester or ether, in order to produce a wide range of compound shades. By using for the topping process dischargeable dyes, dischargeable compound shades can be obtained.

If desired, instead of applying the topping colours after the formation of the dye on the material, the said topping colours may be applied prior to the coupling operation; for instance they may be applied to the material together with the nitro-aryl-azo-aniline. In this way some economy of time and materials may often be secured.

According to a further feature of the invention, valuable new azo dyes can be prepared in substance from the diazo components and coupling components specified above. Again, according to the invention, azo dyes can be prepared by coupling the diazo components specified above with an N-α-sulpho-alkyl or other N-substituted derivative of a primary aromatic mono-amine of the benzene series free from nuclear hydroxyl groups, the said derivative being one which is capable of coupling in para position to the amino group and from which the N-substituent can readily be removed, and thereafter removing said N-substituent. Examples of amines which can be coupled in this way are p-xylidine, cresidine, m-toluidine, m-chloraniline and other primary mono-amines of the benzene series, for example, aniline.

In the case where the primary amine is used in the form of an N-substituted derivative of the type referred to above, it is preferable to employ an N-α-sulpho-alkyl compound such as can be obtained by reacting the primary amine with an aldehyde and a bisulphite or with an aldehyde-bisulphite compound. In such cases, the immediate product of coupling is an N-α-sulpho-alkyl derivative of the desired dye, which can readily be converted into the parent dye, e. g. by heating with aqueous alkali. Very good results can be obtained by employing the amine coupling components in the form of their N-sulpho-methyl derivatives obtainable by the action of formaldehyde-bisulphite thereon.

Instead of the N-α-sulpho-alkyl compound there can be used other N-substituted derivatives of the amine which are capable of coupling in para position to the amino group, and from which N-substituent can be readily removed, for example the sulphamic or nitramic acid of the amine. As in the case of the N-α-sulpho-alkyl compounds the N-substituent can readily be removed by hydrolysis.

The azo dyes produced in substance can be employed for colouring cellulose ester or ether materials by direct dyeing methods though in general, this method of colouring such materials is less advantageous than the method of forming the dyes on the fibre as described above. When formed in substance the dyes are of particular value for colouring cellulose ester or ether solutions, especially lacquers and spinning solutions. By shaping and setting such solutions in the form of filaments, straws, films and the like valuable coloured products can be produced. For example coloured cellulose acetate filaments can be produced by dry spinning such coloured solutions. The coloured products so obtained by spinning methods can be topped with suitable direct dyeing dyes or mixtures of dyes in order to produce a wide range of deep shades.

The dyes of the present invention are particularly useful for the production of coloured cellulose acetate products. They may, however, be used for the production of coloured products of other cellulose esters, for example cellulose formate, propionate, butyrate or acetobutyrate or of cellulose ethers, for example methyl, ethyl or benzyl cellulose.

The invention is illustrated by the following examples, all parts being by weight:

*Example 1*

5 parts of a 10% aqueous paste of 4-nitro-2-chlor-benzene-azo-m-chlor-aniline is dispersed in 3000 parts of water containing 0.25 gram per litre of soap. 100 parts of cellulose acetate fabric is dyed in this bath and thereafter diazotized in a 30:1 bath prepared with 20 parts of concentrated hydrochloric acid and 5 parts of sodium nitrite. After diazotisation the material is rinsed and entered into a cold bath made by dispersing 2 parts of p-xylidine with 10 parts of Turkey red oil in 3000 parts of water. After coupling, the material is rinsed and soaped for half an hour at 60° C. in a soap solution containing 0.25 gram of soap per litre. A golden brown shade is thus obtained.

A somewhat paler golden brown shade is obtained using an equivalent amount of m-toluidine in place of p-xylidine, while m-chloraniline as coupling component gives an orange yellow shade.

By coupling the diazotised 4-nitro-2-chlor-benzene-azo-m-chloraniline with p-xylidine, m-toluidine or m-chloraniline in substance, there is obtained a product suitable for incorporation in cellulose acetate spinning solutions. Filaments, foils, films and the like obtained by spinning such a solution are coloured in golden brown to orange yellow shades.

*Example 2*

2 parts of cresidine is warmed with 1 part of concentrated hydrochloric acid and a small quantity of water until the cresidine is in solution. This solution is then made up to 3000 parts with water and the mineral acid neutralised by the addition of 10% sodium acetate solution. 100 parts of cellulose acetate fabric which has been dyed with 4-nitro-2-chlorbenzene-azo-m-chloraniline and diazotised as described in Example 1 is then entered, treated in the cold for 15 minutes, warmed to 40° C. for a further 15 minutes, rinsed well and soaped for half an hour at 60° C. in a soap solution containing 0.25 gram of soap per litre. A brown shade is thus obtained.

By coupling the diazotised 4-nitro-2-chlorbenzene-azo-m-chloraniline with cresidine in substance there is obtained a product suitable for incorporation in cellulose acetate solutions. Filaments, foils, films and the like obtained by spinning such a solution are coloured in brown shades.

Having described our invention, what we desire to secure by Letters Patent is:

1. Process for the coloration of cellulose acetate materials, which comprises forming an azo dye on the materials by incorporating in the materials a 4-amino-4'-nitro-azobenzene, diazotizing this amino-azo compound and coupling it with m-chloraniline.

2. Process for the coloration of cellulose acetate materials, which comprises forming an azo dye on the materials by incorporating in the materials a 4-amino-4'-nitro-azobenzene containing halogen in at least one of the benzene nuclei in ortho-position to the azo group, diazotizing this amino-azo compound and coupling it with m-chloraniline.

3. Process for the coloration of cellulose acetate materials, which comprises forming an azo dye on the materials by incorporating in the materials a 4-amino-4'-nitro-azobenzene of the general formula

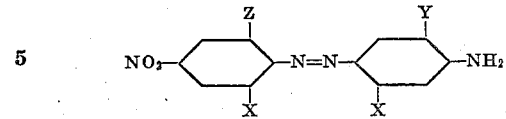

wherein one X represents halogen and the other X is selected from the group consisting of hydrogen and halogen, Y is selected from the group consisting of hydrogen, halogen, alkyl and alkoxy and Z is selected from the group consisting of hydrogen and halogen, diazotizing this amino-azo compound and coupling it with m-chloraniline.

4. Process for the coloration of cellulose acetate materials, which comprises forming an azo dye on the materials by incorporating in the materials 4-nitro-2-chlorbenzene-azo-m-chloraniline, diazotizing this amino-azo compound and coupling it with m-chloraniline.

5. Cellulose acetate colored with a compound of the general formula

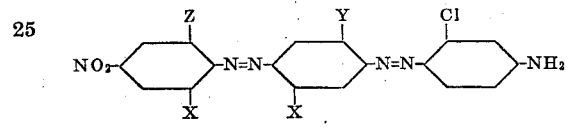

wherein one X represents halogen and the other X is selected from the group consisting of hydrogen and halogen, Y is selected from the group consisting of hydrogen, halogen alkyl and alkoxy, and Z is selected from the group consisting of hydrogen and halogen.

KENNETH RONALD HOUSE.
HENRY CHARLES OLPIN.